United States Patent [19]

Whetstone, Sr.

[11] 4,453,331
[45] Jun. 12, 1984

[54] FISHHOOK SETTING TRIGGER

[76] Inventor: Clifford O. Whetstone, Sr., 1324 West 4, Ontario, Calif. 91762

[21] Appl. No.: 359,453

[22] Filed: Mar. 18, 1982

[51] Int. Cl.³ .............................................. A01K 91/06
[52] U.S. Cl. ......................................................... 43/15
[58] Field of Search ..................................... 43/15, 16

[56] References Cited

U.S. PATENT DOCUMENTS

| 422,331 | 2/1890 | Bradford | 43/15 |
| 1,996,704 | 4/1935 | Hawkinson | 43/16 |
| 2,552,516 | 5/1951 | Camp et al. | |
| 2,658,299 | 11/1953 | Maxfield | 43/15 |
| 2,984,039 | 5/1961 | Willey | 43/15 |
| 3,270,457 | 9/1966 | Austin | 43/15 |
| 4,290,222 | 9/1981 | McLeod | 43/15 |

FOREIGN PATENT DOCUMENTS 62781 7/1891 Fed. Rep. of Germany .......... 43/15
984278 7/1951 France ................................... 43/15

Primary Examiner—Nicholas P. Godici
Assistant Examiner—Thomas S. Mieczkowski
Attorney, Agent, or Firm—Robert K. Rhea

[57] ABSTRACT

A base bar is longitudinally secured to a fishing rod forwardly of its handle and in alignment with the fishing rod line guide rings. A sleeve-like housing, at the rearward end portion of the base bar, pivotally supports a spring biased lever for movement of its other end portion toward and away from the forward end portion of the base bar. A ring, pivotally secured to the forward end portion of the base bar, supports the lever in cocked position and forms a trigger released by a pull on the fishing line for releasing the lever from its cocked position. A guide ring, on the forward end of the lever parallel with the plane of the pivoting ring, jerks the fishing line rearwardly when the lever is released.

1 Claim, 3 Drawing Figures 4,453,331

FISHHOOK SETTING TRIGGER

BACKGROUND OF THE INVENTION

1. Field of the Invention

The present invention relates to fishing and more particularly to a fishhook rod setting trigger.

2. Description of the Prior Art

Prior patents disclose various devices for setting a fishhook in a fish mouth in response to a pull on the bait or lure. These devices generally comprise two embodiments, one being an earth engaging trigger assembly which supports the fishing rod after casting the bait wherein the line is attached to the trigger assembly. The other embodiment usually comprises pivoting arm assemblies mounted on the fishing rod which are generally cumbersome and materially adds to the mass of the fishing rod when casting or reeling in the fish.

The most pertinent prior patent is believed to be U.S. Pat. No. 2,552,516 which discloses an elongated body for longitudinal attachment to a fishing rod which features a head gripping an intermediate portion of the line and is longitudinally slidable in a body slot. The line is entrained through a slot in a latch held in a head cocked position by a pivotal lever so that the latch and lever are released by a pull on the line allowing the spring biased head to be moved toward the other end of its slot for an impulse jerk on the line.

This invention is distinctive over prior art patents by providing a relatively lightweight trigger assembly which includes a base bar longitudinally secured to an intermediate portion of a fishing rod having a sleeve housing pivotally supporting a lever spring biased for movement laterally of the rod with the other end of the lever supported in cocked position by a trigger ring through which the line is entrained in a manner to release the lever by a pull on the line.

SUMMARY OF THE INVENTION

An elongated base bar is longitudinally secured to a fishing rod forwardly of its handle and in alignment with the fishing line guide rings. A split sleeve housing is longitudinally secured to one end portion of the base bar with its wall forming a downwardly open slot. An elongated lever is pivotally connected at one end to the housing intermediate the ends of the slot. A spring connects the rearward end portion of the lever to the rearward end of the sleeve for normally biasing the other end portion of the lever rearwardly. A trigger ring is pivotally connected with the forward end portion of the base bar with the plane of the ring normal to the longitudinal axis of the base bar for supporting the forward end of the lever in a cocked position. A smaller diameter guide ring is rigidly connected with the forward end of the lever adjacent or in the plane of the pivoting ring. An intermediate ring is similarly transversely connected to the base bar and forms a fishing line guide and a stop for the lever when moved toward the fishing rod. The fishing line is entrained through the lever end ring and pivoting ring in a manner to pivot the pivoting ring forwardly and release the lever from its cocked position in response to a fish bite on a lure or bait permitting the lever to jerk the line rearwardly. A lock pin, supported by the sleeve, secures the lever in its cocked position when not in use.

The principal objects of this invention are to provide a fishhook setting trigger assembly to be mounted on a fishing rod through which the fishing line is slidably entrained for ease in casting and in which the fishing line releases the trigger from a cocked position by a pull on the line as a result of a fish taking the bait which imparts an impulsive jerk on the fishing line when the trigger is released and in which a lever of the trigger assembly is spring biased to assist the fisherman in maintaining the fishing line taut while reeling in the fish.

DESCRIPTION OF THE PREFERRED EMBODIMENT

Figure 1:
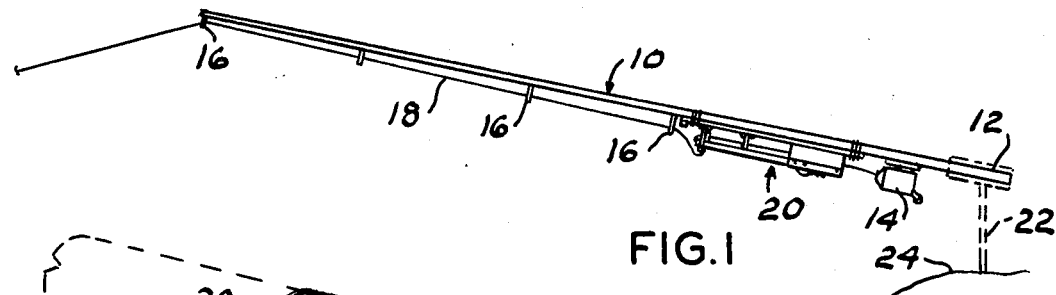
FIG. 1 is a side elevational view of the device mounted on a fishing rod supported by a rod holder.

Like characters of reference designate like parts in those figures of the drawings in which they occur.

In the drawings:

The reference numeral 10 indicates a conventional fishing rod having a handle 12 including a reel 14 mounted thereon adjacent the handle 12 and having a plurality of longitudinally spaced fishing line guides or rings 16 through which the line 18 is entrained.

The numeral 20 indicates the trigger assembly mounted on the fishing rod in the spacing between the reel and rearwardmost line guide 16. The fishing rod 10 may be supported by a conventional fishing rod holder 22 inserted in the surface of the earth 24 by placing the holder 12 in the support 22.

The trigger assembly 20 comprises an elongated base bar 26 which longitudinally flatly contacts the fishing rod with its respective end portions 28 and 30 secured to the rod 10, as by string or cord 32 wrapped around the fishing rod and respective end portions of the base bar. A housing comprising a split sleeve 34, of selected length, is secured to and depends from the base bar adjacent its rearward end portion 30, as by screws or rivets 36. Opposing edge portions of the split wall of the sleeve form a downwardly open slot defined by a pair of parallel spaced-apart panels 38 coextensive with the sleeve and projecting in a direction oppisite the base bar 26.

One end portion of a lever 42 is interposed between the sleeve walls 38 and secured thereto, as by a rivet 44, for vertical pivoting movement of the other end portion 46 of the lever toward and away from the fishing rod 10. An apertured depending lug or ear 48, on the rearward end portion of the lever, is connected with one end of a spring 50 connected at its other end to a rivet 52 extending between the panels 38 for biasing the lever end portion 46 rearwardly. The lever 42 may be locked in parallel spaced relation with the rod 10, as for casting a fish bait or lure or when not in use, by a spring urged lock pin 54 projecting transversely through the sleeve panels 38 and the lever forwardly of the rivet 44.

A trigger ring 56, disposed with its plane perpendicular to the longitudinal axis of the base bar 26, is pivotally connected to its depending surface adjacent its forward end portion 28 and adjacent the forward limit of the lever 42 when the latter is in locked position. When the lever 42 is in cocked position the pivoting ring 56 encircles and supports the forward end portion of the lever against the bias of the spring 50 tending to pivot the lever downwardly and rearwardly.

A small magnet 57 is secured to the base bar 26 at its forward end portion 28 for holding the pivoting ring 56 in an out-of-the-way position while casting.

A lever ring 58, of smaller diameter than the pivoting ring 56, is rigidly secured to the upper surface of the lever adjacent its forward end parallel with and preferably adjacent the plane of the pivoting ring 56 to induce a pull on the fishing line when the lever is released, as presently explained.

An intermediate line guide ring 60 is similarly rigidly secured to the depending surface of the base bar 26 in the spacing between the forward end of the sleeve 34 and forward end of the lever to form a fishing line guide forwardly of the sleeve when the lever has been released.

OPERATION

Figure 2:
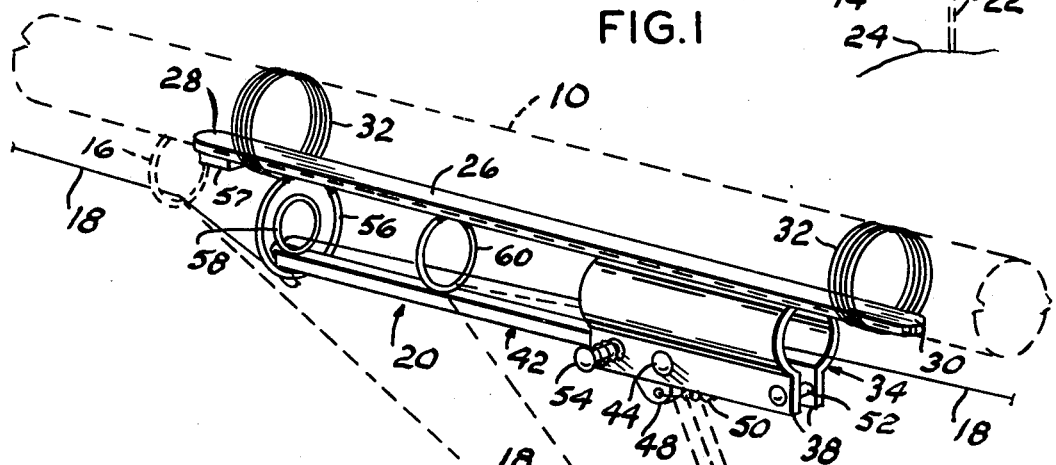
FIG. 2 is a fragmentary perspective view of the device, to a larger scale, and an intermediate portion of the fishing rod and illustrating, by dotted lines, the released position of the lever; and, FIG. 3 is a fragmentary side elevational view, partially in section, illustrating the cocked position of the trigger assembly.
Figure 3:
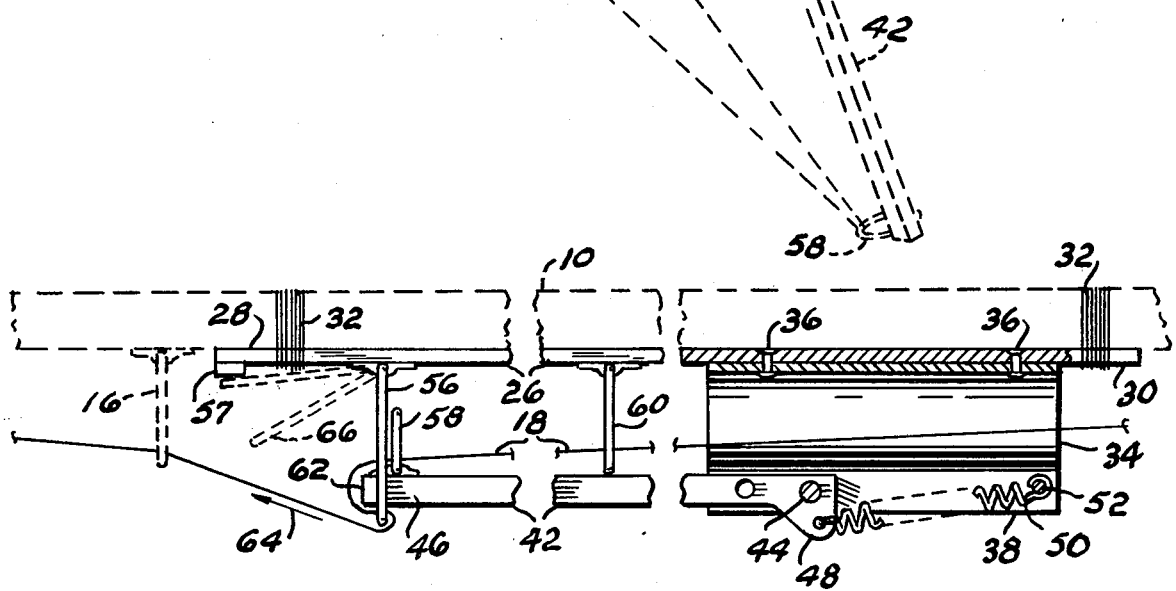

In operation, the trigger assembly 20 is connected to a fishing rod 10, as described hereinabove. The fishing line 18 is successively entrained through the sleeve 34, rings 60 and 58 and fishing rod guide rings 16 and connected with a baited hook or lure, not shown. With the lever 42 locked by the pin 54, in its solid line position of FIG. 2, and the pivoting ring 56 supported by contact with the magnet 57 the bait or lure is cast into the water, not shown, to be fished. After casting the bait, the pivoting ring 56 is moved to its solid line position of FIGS. 2 and 3 and the lock pin 54 retracted. In this position the fishing line 18 extends through the fixed ring 58, downwardly over the forward end surface 62 of the lever projecting forwardly of the plane of the ring 56 and forwardly under the depending arcuate portion of the pivoting ring 56 to form the release for the lever. The reel 14 is locked to hold the fishing line against forward longitudinal movement of the line. When a fish takes the bait and induces a pull on the fishing line 18, in the direction of the arrow 64, this pull on the line pivots the ring 56 forwardly toward its dotted line position 66 (FIG. 3) thus releasing the forward end portion 46 of the lever permitting the spring 50 to quickly bias the forward end portion of the lever rearwardly, to its dotted line position of FIG. 2, thus setting the hook in the fish mouth. Thereafter, the fisherman may begin reeling in the hooked fish wherein the spring 50 biasing the lever 42 rearwardly permits forward and rearward movement of the lever and maintains the fishing line taut when the fish changes directions while the fisherman is reeling in the fish.

Obviously the invention is susceptible to changes or alterations without defeating its practicability. Therefore, I do not wish to be confined to the preferred embodiment shown in the drawings and described herein.

I claim:

1. A device for impulsively jerking a fishing line in response to movement of the fishing line caused by a fish taking the bait on a hook attached to the fishing line, comprising:

an elongated base bar longitudinally secured to a fishing rod;

a housing comprising a split sleeve having a slot supported by said base bar;

a lever pivotally connected at one end portion within said housing slot for pivoting movement of its other end portion relative to said housing toward and away from said base bar;

spring means in said housing normally biasing said lever away from said base bar; and, trigger means including a pair of rings adjacent said lever other end portion when the lever is in cocked position through which the fishing line is entrained in a manner to move one ring of said pair of rings relative to the other for releasing the lever and jerking the fishing line, said one ring of said pair of rings being pivotally connected with said base bar and the plane of said one ring disposed perpendicular to the longitudinal axis of said base bar and normally surrounding said other end portion of the lever when the latter is in cocked position, the other ring of said pair of rings being rigidly secured to said other end portion of said lever to project toward said base bar adjacent and parallel with the plane of said one ring when the lever is in cocked position.

* * * * *